US007591012B2

(12) United States Patent
Jaganathan et al.

(10) Patent No.: US 7,591,012 B2
(45) Date of Patent: Sep. 15, 2009

(54) DYNAMIC NEGOTIATION OF ENCRYPTION PROTOCOLS

(75) Inventors: Karthik Jaganathan, Redmond, WA (US); Liqiang Zhu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 10/791,035

(22) Filed: Mar. 2, 2004

(65) Prior Publication Data

US 2005/0198490 A1    Sep. 8, 2005

(51) Int. Cl.
*H04L 9/18*    (2006.01)
*H04L 29/00*    (2006.01)

(52) U.S. Cl. .......................................... 726/14; 380/278
(58) Field of Classification Search .................. 380/28, 380/259–260, 278–280; 726/12, 14, 20
See application file for complete search history.

(56) References Cited

U.S. PATENT DOCUMENTS

| 6,950,862 | B1 * | 9/2005 | Puthiyandyil et al. ....... 709/220 |
| 2004/0136533 | A1 * | 7/2004 | Takagaki et al. ............ 380/255 |
| 2004/0205331 | A1 * | 10/2004 | Hussain et al. .............. 713/153 |

OTHER PUBLICATIONS

Swift, M. "RFC 3244-Microsoft Windows 2000 Kerberos Change Password and Set Password Protocols." Feb. 2002.*
Coffman, Kevin. "rpcsec_gss, kadmind service principal, etc." Dec. 9, 2002.*
Swift, M. "RFc 3244-Microsoft Windows 2000 Kerberos Change Password and Set PasswordProtocols." Feb. 2002.*
Ashley, P. et al., "Applying authorization to intranets, architectrues, issues and APIs," *Computer Communications*, 2000, 23(17), 1613-1620.
Baize, E. et al., "The Simple and Protected GSS-API Negotiation Mechanism," *RFC 2478*, Dec. 1998, 14 pages.
Kohl, J. et al., "The Kerberos Network Authentication Service (V5)", Sep. 1993, 35 pages.
Talibov, A., "Implementing an SSL/TLS-enabled client/server on windows using GSS API," *C/C++ Users J.*, 2003, 21(8), 18, 20-23.
Tarman, T.D. et al., "Algorithm-Agile Encryption in ATM Networks," *Computer*, 1998, 31(9), 57-64.

* cited by examiner

*Primary Examiner*—Gilberto Barron, Jr.
*Assistant Examiner*—Venkat Perungavoor
(74) *Attorney, Agent, or Firm*—Woodcock Washburn LLP

(57) ABSTRACT

Systems and methods for negotiating an encryption algorithm may be implemented in the context of encryption-based authentication protocols. The invention has the added benefit of providing a system an method that need not interfere with the standard operation of authentication protocols. A first computer, or client computer, can send a negotiation request to a second computer, or server computer. The negotiation request can specify that the client computer supports a selected encryption algorithm. In response, the server computer can return a subsession key for encryption using the selected encryption algorithm. Both client and server may then switch to encryption in the selected encryption algorithm, using the subsession key to encrypt future communications.

23 Claims, 9 Drawing Sheets

Kerberos Authentication Protocol

DYNAMIC NEGOTIATION OF ENCRYPTION PROTOCOLS

FIELD OF THE INVENTION

This invention relates to electronic communications security, and more particularly to authentication of devices using encryption.

BACKGROUND OF THE INVENTION

Encryption, generally, is the conversion of data into a form, called a ciphertext or cipher, that cannot be easily understood by unauthorized people. Decryption is the process of converting encrypted data back into its original form, so it can be understood. Simple ciphers include the substitution of letters for numbers, the rotation of letters in the alphabet, and the "scrambling" of voice signals by inverting the sideband frequencies. More complex ciphers work according to sophisticated computer algorithms that rearrange the data bits in digital signals.

Encryption algorithms in use today, such as Ron's Code 4 ("RC4"), Data Encryption Standard ("DES"), Triple DES ("3DES"), and the newly introduced (2000) Advanced Encryption Standard ("AES"), are capable of encrypting and decrypting data based on input (such as a password) entered by a user. For example, a first user ("George") can encrypt his data using his password, "Cloud9," while a second user ("Martha") can encrypt her data differently using his own password, "go2mars." George and Martha, by using different passwords, are generating different encryption and decryption keys. Martha will not be able to decrypt George's data unless she gets George's decryption key (in this example, his password, Cloud9), and uses the key with the appropriate encryption algorithm (AES), to decrypt George's data.

Encryption algorithms are also capable of "asymmetric encryption" in which two keys can be associated with encrypted data. Data encrypted using the first key can only be decrypted with the second key, and vice-versa. This allows for the generation of public/private key systems. In such a system, a public key may be distributed publicly, which allows anyone to encrypt data using the public key. The private key, however, is the only key that can decrypt the data that was encrypted using the public key. Once again, remember that these systems rely on use of the same encryption algorithm. If a public key is used to encrypt data using one particular encryption algorithm, the private key must be used in conjunction with the same encryption algorithm to decrypt the data.

Authentication is the process of determining whether someone or something is, in fact, who or what it is declared to be. In private and public computer networks (including the Internet), authentication is commonly done through the use of usernames and passwords. Knowledge of a password is assumed to verify the user's identity. Each user registers initially, using an assigned or self-declared password. On each subsequent use, the user must know and use the previously declared password. Many institutions require a more stringent authentication process than the simple username and password approach. Such processes frequently involve encryption.

Encryption lends itself naturally to authentication, because a device that is able to decrypt a uniquely encrypted message can effectively prove its identity. Many authentication protocols, such as Kerberos, New Technology LanManager ("NTLM"), and the like utilize this feature of encryption for authentication. An authentication protocol is a sequence of steps that are carried out in an authentication. For a detailed explanation of an exemplary authentication protocol, refer to the detailed description section of this document, which describes the popular Kerberos authentication protocol.

On large computer networks, such as the Internet, encryption is an especially valuable tool for authentication because it allows one computer to authenticate another computer without any prior contact between the two computers. Compare this to the situation where a server assigns a username and password to a client. In that scenario, some prior communication may be required so both parties know the username and password, and moreover a server must keep a list of all the client devices, along with the relevant usernames and passwords, that are allowed access to server resources. As networks grow larger, storing this information becomes unruly. Authentication using passwords has at least two additional shortcomings. First of all, it is time-consuming for the user. Secondly, and more importantly, it is insecure when accessing services on a remote machine. For instance, if a user is logged into a first remote machine, and decides to login from there to another remote machine, then the user's password would travel to the second remote machine "in the clear" (unencrypted). Clearly, this is unacceptable.

In contrast, when encryption is used, a client device can obtain an encrypted piece of data from a third party. It can send this data to a server that possesses a decryption key for the data. By demonstrating its ability to decrypt the data, the server can authenticate itself to the client. Similar techniques can be employed to allow the reverse, i.e., allowing the client to authenticate itself to the server. Once again, this process will be explained in greater detail below.

By allowing authentication between computing devices that have not had prior communication, a potential problem of interoperability arises. More specifically, various computing devices may not use the same encryption algorithm. As alluded to above, if a first computer user, George, is using RC4 as an encryption algorithm, and a second computer user, Martha, is using DES, it does not matter that Martha may have the decryption key for data sent from George. The different encryption algorithm will both encrypt and decrypt data differently, so Martha's attempt to decrypt data sent from George will fail because the key types possessed by both sides do not match.

Even when interoperability is possible, the users or administrators of the computing devices may prefer one encryption algorithm over another. Historically, interoperability and/or user preference in encryption algorithms have not raised significant barriers to using encryption for authentication. This may have been in part because MICROSOFT® WINDOWS, a widely used operating system, ships equipped with the RC4 encryption algorithm. However, as encryption becomes more widely used, in the context of authentication and otherwise, emerging encryption algorithms are likely to come into wider use. Namely, at the time of this writing, the AES encryption algorithm has been adopted as the encryption standard for the United States government, and is likely to experience increased use.

To the extent that interoperability and user preference have been addressed, it has been in the form of prior manual notification to relevant computers that a particular server runs a different encryption algorithm than RC4. For example, an administrator might designate a server as "DES only" in an appropriate field of a client computer, allowing that client to later authenticate itself to the server. The server could also be designated "DES only" with an appropriate "ticket granting service," or server that provides encrypted authentication data to client computers. Both of these techniques are cumbersome and not realistically scalable to widespread use of encrypted data as a means of authentication in computer networks.

In light of the above shortcomings in the art, there exists a heretofore unaddressed need to provide for interoperability and user preference in computing devices that engage in encryption-based authentication protocols.

SUMMARY OF THE INVENTION

Systems and methods for negotiating an encryption algorithm are provided herein. Various embodiments of the invention allow for encryption algorithm negotiation in the context of encryption-based authentication protocols, and the invention has the added benefit of providing a system an method that need not interfere with the standard operation of authentication protocols. A first computer, or client computer, can send a negotiation request to a second computer, or server computer. The negotiation request can specify that the client computer supports a selected encryption algorithm. In response, the server computer can return a subsession key for encryption using the selected encryption algorithm. Both client and server may then switch to encryption in the selected encryption algorithm, using the subsession key to encrypt future communications.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 5A:
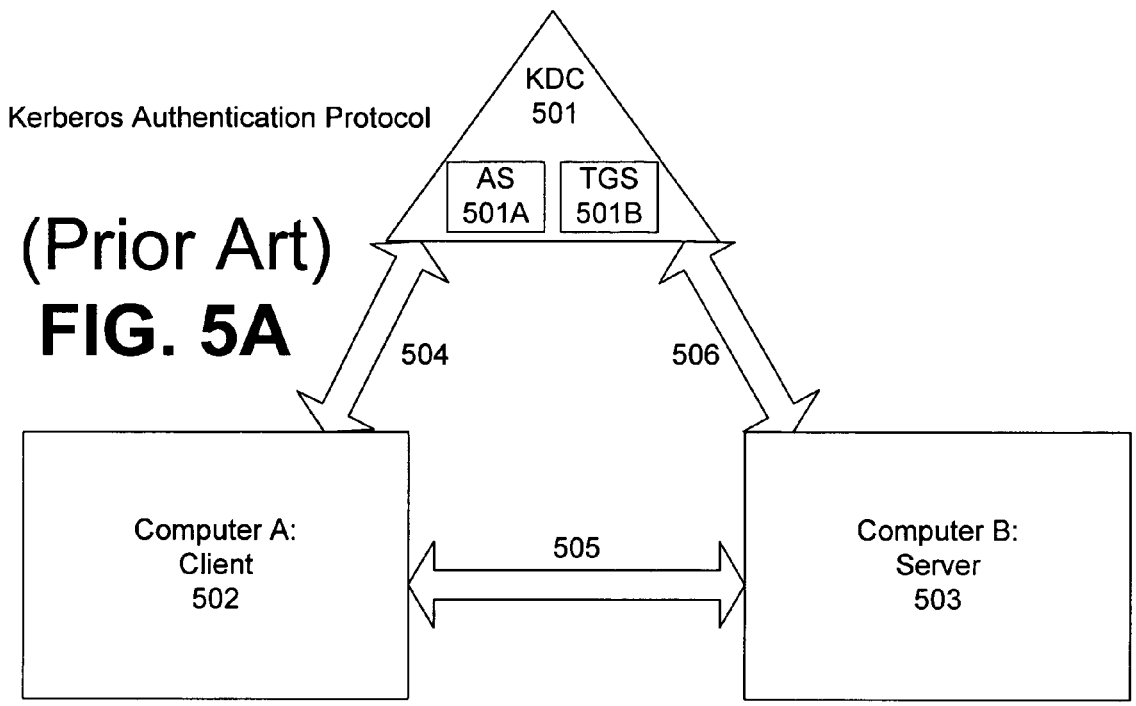
FIG. 5A is a diagram showing the three processes involved in the Kerberos authentication protocol.

In the figures corresponding to the following detailed description, identically identified elements relate to similar features. For example, Computer A 502 in FIG. 5A is the same Computer A 502 in FIG. 5B, FIG. 6, FIG. 7, etc. This is done for easy reference back and forth between the figures, and to help provide a greater context for the components in the figures. However, it should be noted that various aspects of elements such as Computer A 502, as well as other elements depicted in multiple figures, are changed from figure to figure to point out aspects of the invention. These aspects are always provided with a unique identifier, such as Negotiation Request 700, so that it is clear whether such aspects are or are not part of an element in a previous or subsequent figure.

Figure 1:
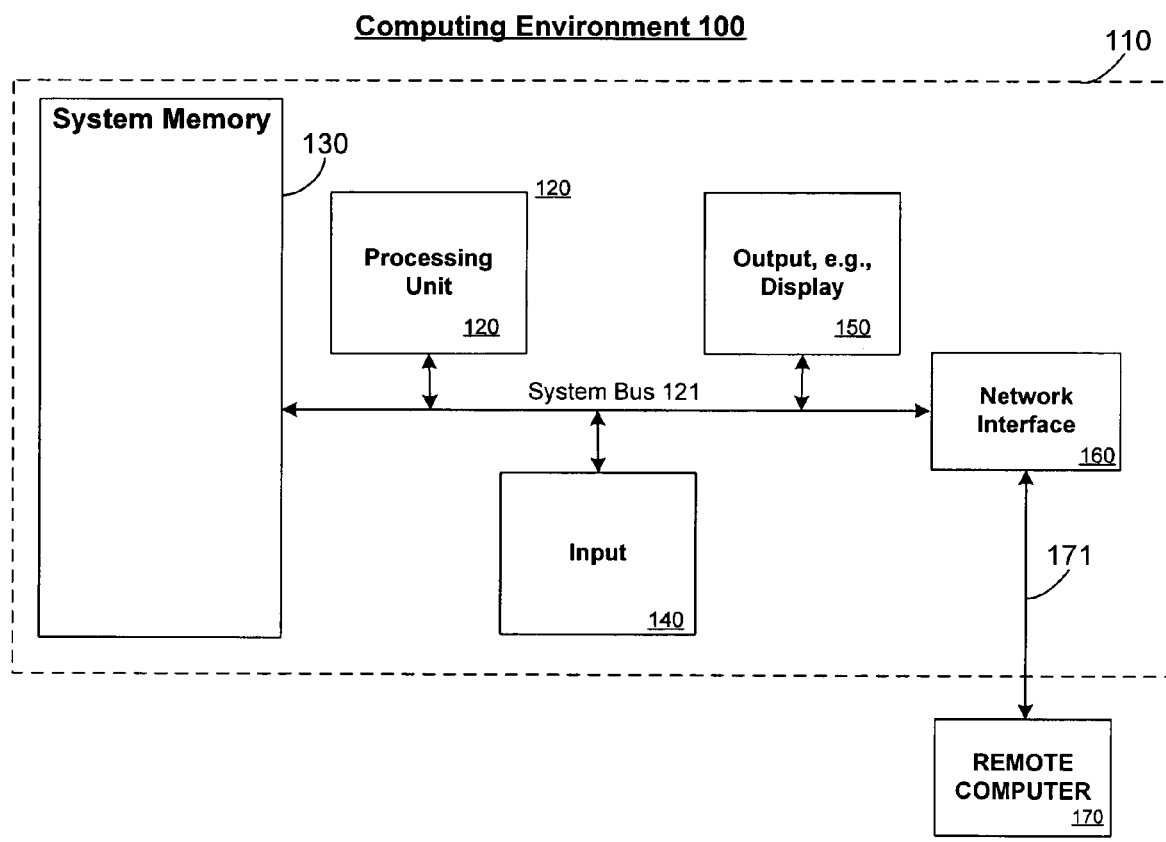
FIG. 1 is an exemplary computing environment suitable for practicing embodiments of the invention.

Various aspects of the invention are designed for implementation in conjunction with computing devices. FIG. 1 and the following discussion are intended to provide a brief general description of a suitable computing environment 100. It should be understood that handheld, portable and other computing devices and computing objects of all kinds are contemplated for use in connection with the present invention, i.e., anywhere where that encryption is supported in a computing environment. While a general purpose computer is described below, this is but one example, and embodiments of the invention may be implemented with a thin client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of encryption algorithm negotiation techniques in accordance with the invention.

The invention can be implemented via an operating system, for use by a developer of services for a device or object, and/or included within application software that operates in connection with the encryption negotiation techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network bus or other data transmission medium. In a distributed computing environment, program modules may be located in both local and remote computer storage media including memory storage devices, and client nodes may in turn behave as server nodes.

With reference to FIG. 1, an exemplary system for implementing the invention includes a general purpose computing device in the form of a computer 110. Components of a computer 110 may include, but are not limited to, a processing unit 120, a system memory 130, and a system bus 121 that couples various system components, including the system memory, to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media (not shown). Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Computer readable media may also include communication media, which typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 120. System memory 130 may also include portions of an operating system, application programs, other program modules, and program data.

The computer 110 may also include other removable/non-removable, volatile/nonvolatile computer storage media. For example, many computers have a hard disk drive (not shown) that reads from or writes to non-removable, nonvolatile magnetic media, a magnetic disk drive (not shown) that reads from or writes to a removable, nonvolatile magnetic disk, and an optical disk drive (not shown) that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive is typically connected to the system bus 121 through a non-removable memory interface, and magnetic disk drives and optical disk drives are typically connected to the system bus 121 by a removable memory interface.

A user may enter commands and information into the computer 110 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120 through a user input interface 140 that is coupled to the system bus 121, but may be connected by other interface and bus structures, such as a parallel port, game port or a universal serial bus (USB). A monitor or other type of display device may also be connected to the system bus 121 via an interface, such as a video interface, which may in turn communicate with video memory. In addition to a monitor, computers may also include other peripheral output devices such as speakers and printers, which may be connected through an output peripheral interface 150.

The computer 110 may operate in a networked or distributed environment using logical connections to one or more remote computers, such as a remote computer 170. The remote computer 170 may be a personal computer, a server, a router, a network PC, a peer device or other common network node, and typically includes many or all of the elements described above relative to the computer 110. The logical connection 171 depicted in FIG. 1 can include a local area network (LAN), a wide area network (WAN) 173, or other networks/buses. Such networking environments are commonplace in homes, offices, enterprise-wide computer networks, intranets and the Internet.

When used in a LAN networking environment, the computer 110 is connected to the LAN 171 through a network interface or adapter 160. When used in a WAN networking environment, the computer 110 typically includes a modem or other means for establishing communications over the WAN. The modem, which may be internal or external, may be connected to the system bus 121 via the user input interface 140, or other appropriate mechanism. In a networked environment, program modules depicted relative to the computer 110, or portions thereof, may be stored in the remote memory storage device.

Various embodiments of the invention relate to negotiation between two computing devices, or between processes running on the same device, as described above. Negotiation is the determination of a result based on the characteristics of two or more computing entities. Negotiation may be performed directly between one device and another device, or one process and another process, or it may be performed by one or more mediating third parties, which determine the characteristics of the devices or processes involved, and produce a result based on those characteristics. While negotiation between processes running on the same device may occur via internal communications, negotiation between physically distinct devices may occur over a computer network such as the internet. In this regard, FIG. 2 and the following brief discussion provide an introduction to an exemplary computer network for use in connection with the invention.

Figure 2:
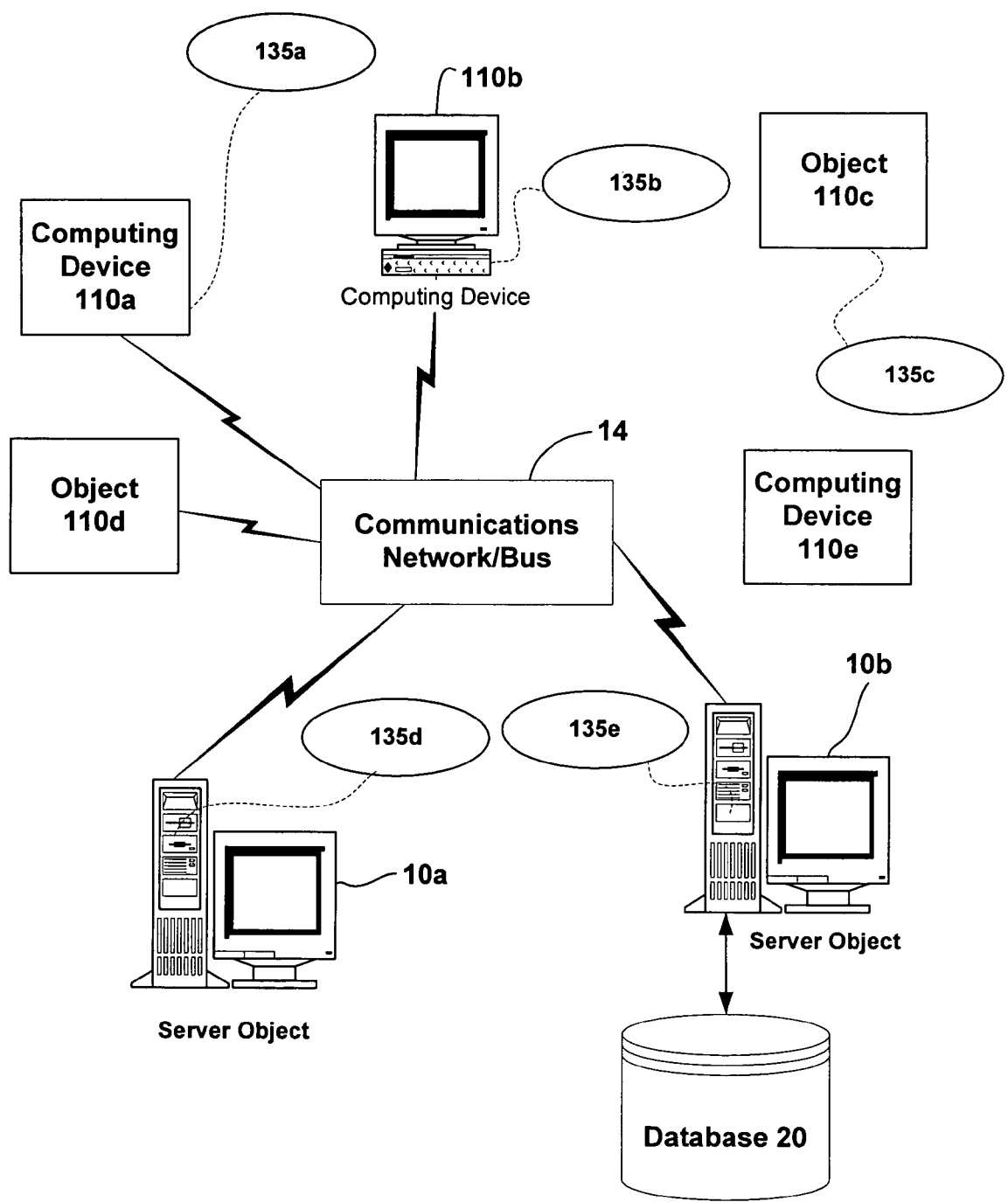
FIG. 2 is an exemplary computer network suitable for practicing embodiments of the invention.

FIG. 2 provides a schematic diagram of an exemplary networked computing environment. The networked environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of encryption algorithm negotiation processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to encryption algorithm negotiation according to the present invention.

The network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 110a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the encryption algorithm negotiation techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the encryption algorithm negotiation techniques of the invention may be distributed across multiple computing devices or objects.

Client(s) and server(s) communicate with one another utilizing the functionality provided by protocol layer(s). For example, Hyper Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication. Establishing communications, and subsequent transfer of data between computers, may be independent of whether the data is encrypted. For example, HTTP transfers data in a plurality of data packets, which may be encrypted or unencrypted. An additional protocol may be implemented with encrypted data communications which allows computers to decrypt the data and/or use the encrypted data to authenticate a the computer that is attempting to make contact via the computer network.

Thus, FIG. 2 illustrates an exemplary networked computing environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement encryption algorithm negotiation.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Some networks take advantage of distributed computing. Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the encryption negotiation processes of the invention.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as NET code, and in other distributed computing frameworks as well.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the encryption algorithm negotiation techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

Figure 3:
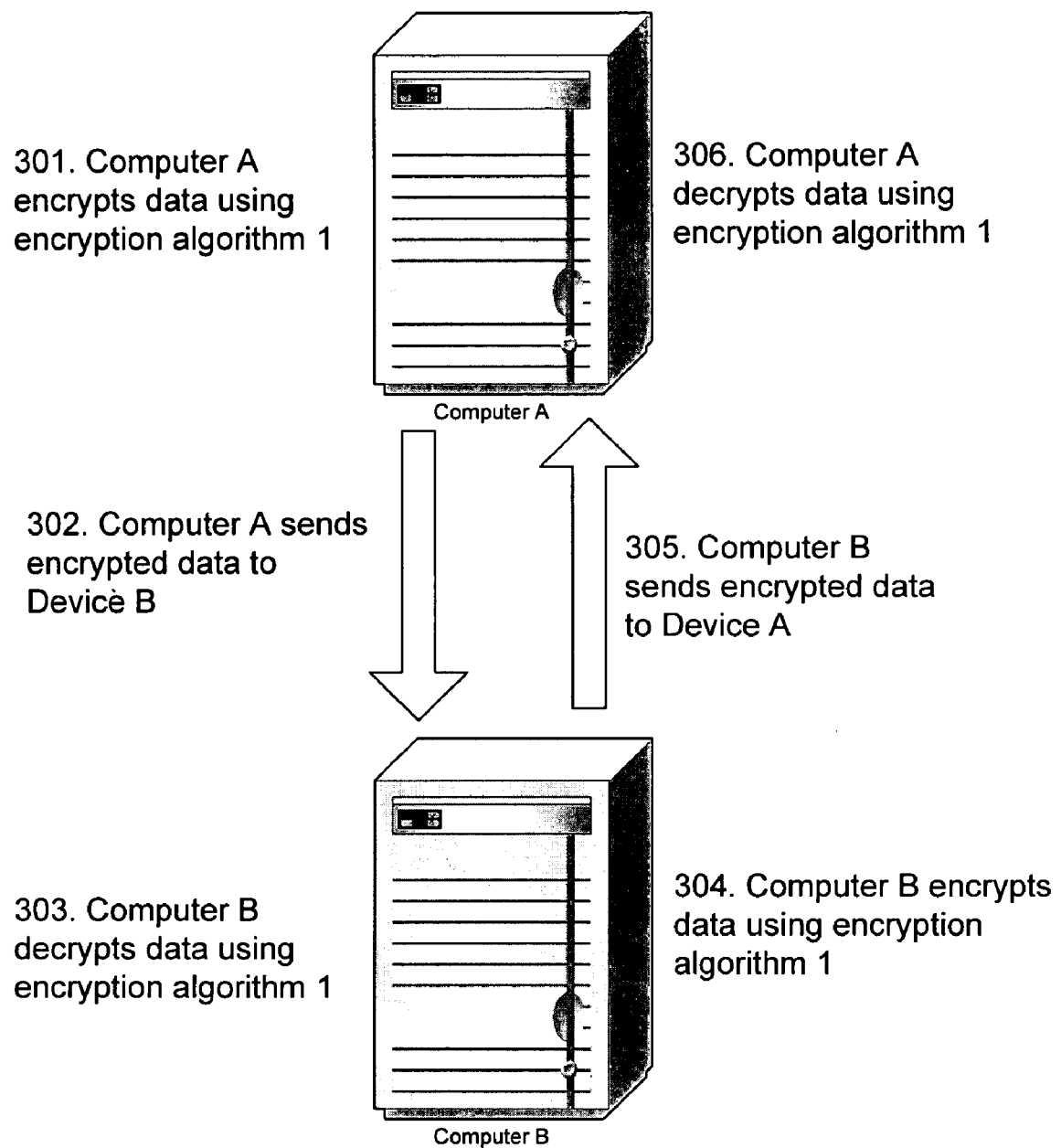
FIG. 3 is an illustration of secure communications using data encryption, showing encryption at a first computer, decryption at a second computer, and vice-versa.

Moving now from the computing and network environment of FIG. 1 and FIG. 2 to a more specific discussion of aspects of the invention, refer to FIG. 3. FIG. 3 is a flow diagram showing the process of encryption as is presently familiar in the art. For the purpose of this application, encryption as performed by Computer A in step 301 is the reversible transformation of data from the original (the plaintext) to a difficult-to-interpret format (the ciphertext). Encrypted data may then be transferred 302 from computer to computer with decreased anxiety regarding the potential acquisition of the data by untrusted third parties. Decryption, as illustrated in step 303 is the subsequent reversal of the transformation: the conversion of the ciphertext back into plaintext. While the terms "ciphertext" and "plaintext" are used here because they are accepted in the art, it should by understood that encryption may involve the transformation of data from any first format to any second format. The "plaintext" need not be "in the clear," or readily readable by most computing devices. Encryption and decryption are typically thought of as a mechanism for protecting confidentiality, but may also be used to protect data integrity, to authenticate data, and to authenticate computing devices. In a preferred embodiment of the present invention, encryption is used in conjunction with the authentication of both user and computer principals, where a computer principal can be a computing device as described above.

Encryption and decryption of data can be accomplished automatically through the use any of a number of available encryption algorithms. An encryption algorithm is an automated encryption process. Popular examples of encryption algorithms are RC4, DES, 3DES, and AES, as explained in the background section. These are but a few examples of a wide variety of encryption algorithms, and the invention is not limited to any particular encryption algorithms. Encryption algorithms can support symmetric encryption, asymmetric encryption, or both. Symmetric encryption refers to requiring the same key to both encrypt and decrypt data. Asymmetric encryption refers to requiring different keys to encrypt and decrypt data. Asymmetric encryption provides the basis for public/private key systems used in authentication, and will be described below in connection with authentication. Both symmetric and asymmetric encryption can be used in connection with this invention.

Encryption algorithms may employ a string of bits known as a "key" to perform the encryption and decryption transformations. When a key is used to encrypt, it may be called an "encryption key," and when a key is used to decrypt, it may be called a "decryption key." In general, the larger the encryption key (the more bits), the greater the number of potential patterns can be created, thus making it harder to break the code and decrypt the data. Keys are typically from 40 to 256 bits in length, for example, AES supports cipher keys of 128, 192, and 256 bits, but keys can theoretically be of any length, and the invention can be used in conjunction with keys of any length. Keys are often based on a secret password entered by a user. As will be described in greater detail below in connection with authentication protocols, however, keys can also be generated automatically and distributed to appropriate devices, processes, and users. The AES encryption algorithm employs both "cipher keys" and "round keys." Cipher keys are entered by a user or process, and round keys are derived from cipher keys by the encryption algorithm prior to encryption of the data to provide an additional layer of protection. Those of skill in the art will appreciate that the present invention can be used in connection with any and all types of keys, whether cipher, round, or keys otherwise in use or later developed in the field of cryptography.

Most encryption algorithms use the block cipher method, which encrypts data in fixed-size blocks. For example, AES processes data blocks of 128 bits. The encryption algorithm on which AES is based, called Rijndael (pronounced "rain doll"), was designed to handle additional block sizes, but these versions were not adopted into the AES standard. Other encryption algorithms use the stream method, which works with the continuous stream of data rather than blocks. Blocks of any size or stream method encryption can be used in connection with the present invention, as well as any other encryption methods presently in use or later developed in the art.

Figure 4:
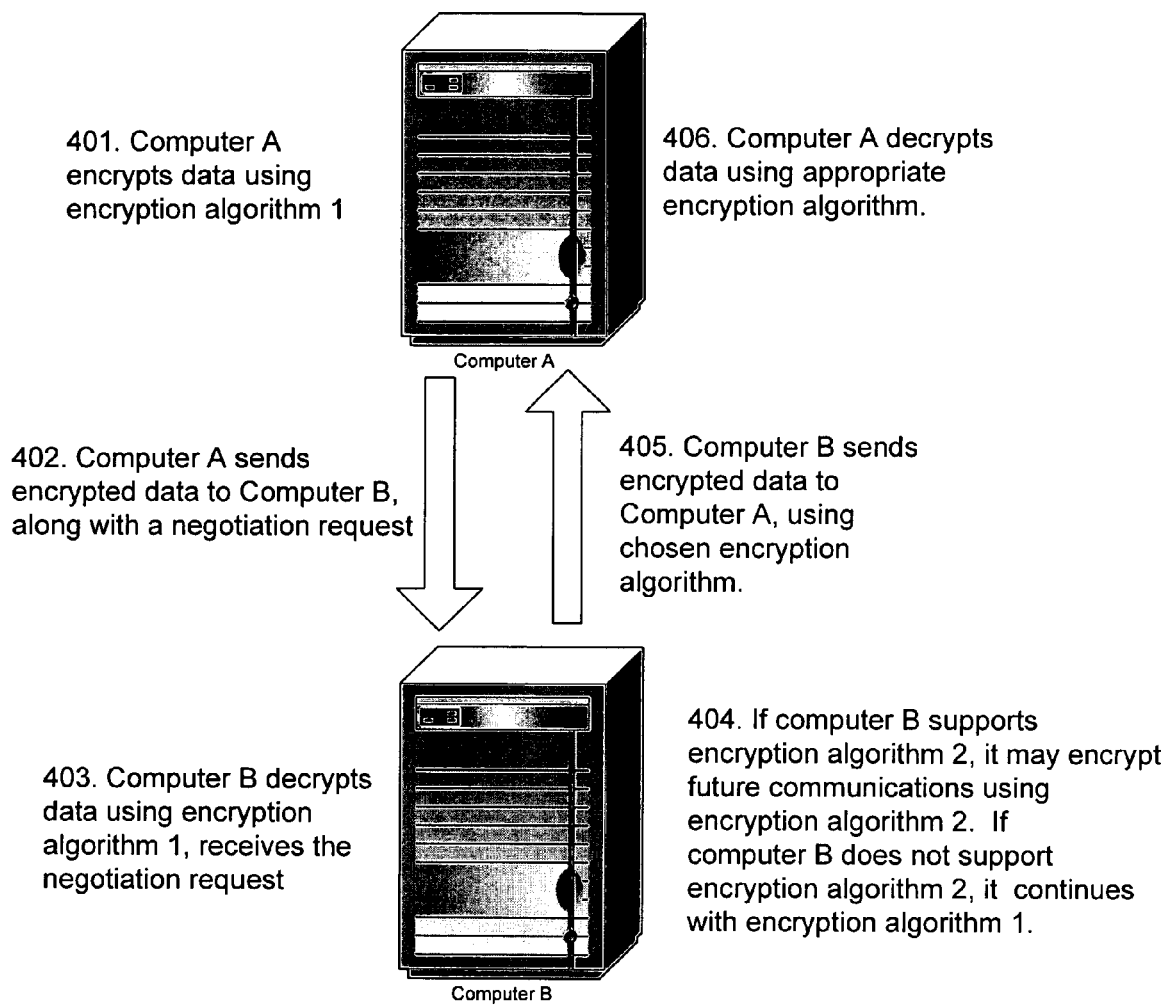
FIG. 4 illustrates negotiation of a new encryption algorithm by sending a negotiation request in accordance with embodiments of the invention.

FIG. 4 presents a view of various embodiments of the invention in a generalized form. FIG. 4 is a useful reference for understanding various basic aspects of the invention. As stated above, embodiments of the invention allow computers to negotiate a new encryption algorithm. In this regard, Computer A can encrypt data using a first encryption algorithm 1, as in step 401. Such a first encryption algorithm 1 may also be referred to herein as a default encryption algorithm. Because of the ubiquitous use of the RC4 encryption algorithm, it is considered likely that RC4 would be the default encryption algorithm, although this choice is not necessary to practice the invention.

Next, step 402 shows that computer A can send the encrypted data, along with a negotiation request, to Computer B. A negotiation request can be any piece or configuration of data that indicates to computer B that Computer A is prepared to change from one or more first encryption algorithms to one or more second encryption algorithms. The negotiation request indicates to the server computer that Computer A supports the requested encryption algorithm. In the example of FIG. 4, Computer A sends a request to change from encryption algorithm 1 to encryption algorithm 2. Encryption algorithm 2 may also be referred to as the new encryption algorithm. AES is the new standard encryption algorithm adopted by the United States Government, and it is considered likely that AES would be the encryption algorithm 2, though this choice is not necessary to practice the invention.

In various preferred embodiments, for example when the invention is used in conjunction with the Kerberos authentication protocol or other authentication protocols that can be accessed using the Generic Security Services Application Programming Interface ("GSSAPI"), a negotiation request can make use of available checksums. These checksums are included with the authentication requests (AP-REQ) of GSSAPI Kerberos, for example. One or more of these checksums can comprise a context negotiation flag that can serve as a negotiation request in accordance with the present invention. Authentication protocols generally, and Kerberos in particular, will be described in greater detail below. Negotiation requests are not limited to checksums generated by GSSAPI authentication protocols. While GSSAPI checksums provide the advantage of submitting the negotiation request simultaneously with the Authentication Protocol Request ("AP-REQ") in the Kerberos protocol, negotiation requests need not be sent simultaneously with encrypted data. Instead, they can be sent prior to, during, or after the transmission of any relevant encrypted data. The negotiation request can itself be encrypted or unencrypted. It will be acknowledged that any communication format or communication timing may be used to send the negotiation request, and that the request may be sent out over any and all available communications signals, including but not limited to the communications technologies described in conjunction with the computer and network of FIG. 1 and FIG. 2.

FIG. 4 demonstrates that Computer B receives the encrypted data and the negotiation request in step 403. If computer B supports the one or more encryption algorithms specified in the negotiation request, it can encrypt future communications with Computer A in one or more of the specified encryption algorithms. As illustrated by way of example but not limitation in FIG. 4, Computer B optionally changes from exemplary encryption algorithm 1 to exemplary encryption algorithm 2 upon receipt and processing of the negotiation request 404. Computer B need not make this switch immediately, in fact it may be beneficial to wait until Computer B has computed and delivered to Computer A a subsession key for use with encryption algorithm 2. Such an implementation will be described below in connection with authentication protocols.

Computer B may if necessary reply to the communication from Computer A, as in step 405, encrypting the reply in the appropriate encryption algorithm as chosen by Computer B based on the negotiation request, if in fact Computer B acknowledged the negotiation request. One advantage of embodiments of the invention as described herein is that Computer B is not required to acknowledge the negotiation request. Instead, Computer B can continue using the original encryption algorithm, as illustrated in step 404, effectively ignoring the negotiation request. This may be the case when the negotiation is a checksum as described above. If, for example, a checksum specifies a switch to the AES encryption algorithm, but Computer B does not support AES and therefore does not recognize the negotiation request, Computer B can simply reply using the original encryption algorithm in step 405 as if there had been no request. The failure to change encryption algorithms can be interpreted by Computer A as a negotiation of the original encryption algorithm. Because Computer A supports both the language of the original communication and the encryption algorithm specified in the negotiation request, Computer A will be equipped in step 406 to decrypt the reply from Computer B regardless of the encryption algorithm utilized by Computer B. Computer A can optionally take the encryption algorithm used by Computer B in its reply as an indicator of the appropriate encryption algorithm for future communications with computer B.

Various additional aspects of the invention provide encryption algorithm negotiation in the context of encryption-based authentication protocols. As mentioned above, an authentication protocol is a sequence of steps that are carried out in an authentication. Many authentication protocols have been designed to authenticate computing devices as well as applications, data or other content. Some such authentication protocols, such as the familiar username and password arrangement for accessing a server, do not make use of encryption. These non-encryption-based authentication protocols are outside the scope of the invention. Instead, the invention can be used in conjunction with encryption-based authentication protocols. An encryption-based authentication protocol is an authentication protocol that makes use of encrypted data to ensure the proper authentication of the devices, applications, users, data, etc.

While aspects of this invention will be described, for clarity, in an environment of discrete and remote computers, the invention can also be applied to authentication protocols in any environment, including application authentication, data authentication, user authentication, remote device authentication, process authentication, and the like. Several kinds of authentication protocols will be described herein for the purpose of introducing terms and concepts in authentication of computing processes, but this is not intended as a list of possible authentication protocols for use with the invention. It will be acknowledged that the invention can be used in conjunction with any encryption-based authentication protocol.

In this regard, various encryption-based authentication protocols make use of asymmetric encryption, where one key is distributed to the public and the other is maintained privately. These protocols typically make use of the Public Key Infrastructure (PKI). PKI enables users of non-secure public networks, such as the Internet, to securely and privately exchange data through the use of a public and a private cryptographic key pair that is obtained through a trusted authority. PKI also provides for a digital certificate that can identify an individual or an organization.

Public key cryptography as used by PKI typically includes a certificate authority, a registration authority, and a directory service. The certificate authority issues and verifies a digital certificate. A digital certificate may include a public key or information about the public key, a name, a serial number, an expiration date, a digital signature of the certificate-issuing authority, and the like.

The registration authority acts as a verifier for the certificate authority before a digital certificate is issued. The directory service stores certificates (with their associated public keys) so that authenticating users can determine others' public keys.

In public key cryptography, a public and private key may be created simultaneously by the certificate authority using the same encryption algorithm. The private key is given only to the requesting party and the public key is made publicly available (as part of a digital certificate) in a directory that all parties can access. The private key is never shared with anyone or sent across the Internet. The private key is used to decrypt a message that has been encrypted with its corresponding public key, by someone else (who can find out what your public key is from a public directory). In addition to encrypting messages (which ensures privacy), a party can authenticate itself (to ensure that it is really that party who sent the message) by using their private key to encrypt a digital certificate, or some other authenticating information such as a time stamp that was encrypted using the public key and is otherwise known only to the encrypting computer.

Figure 5B:
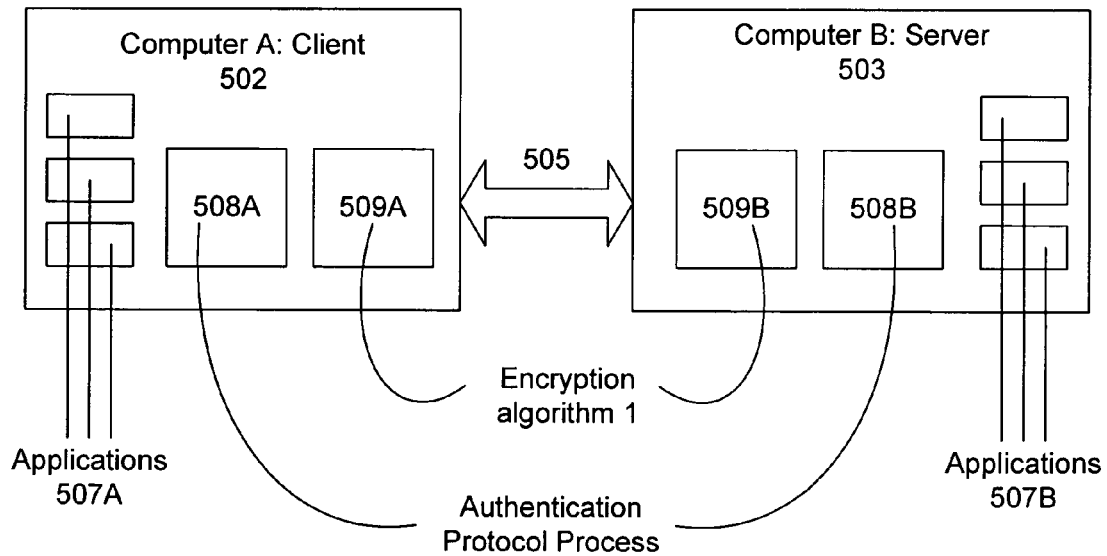
FIG. 5B is a more detailed view of the client computer and server computer involved in an authentication protocol such as Kerberos, showing various authentication processes running on the computers.

Kerberos is another authentication protocol that has experienced wide use. Kerberos was created by the Massachusetts Institute of Technology (MIT) and named for a three-headed dog that guarded the gates of the underworld in Greek mythology. FIG. 5A and FIG. 5B, and the following brief discussion, provide a conceptual illustration of Kerberos for use in conjunction with embodiments of the invention. The three headed dog symbolizes the three processes utilized by Kerberos: the client 502, the server 503, and the Key Distribution Center (KDC) 501. The client 502 and the server 503 are sometimes referred to as "principals." The KDC may comprise an authentication server (AS) 501A and a Ticket Granting Server (TGS) 501B. One advantage of using the present invention in conjunction with the Kerberos authentication protocol is that the invention will not interfere with the established routines of Kerberos. Instead, it allows a switch from one encryption algorithm to another smoothly and without interruption of the Kerberos authentication protocol.

In contrast to the public/private key system described above, Kerberos currently employs shared private keys (symmetric encryption). The authentication process proceeds as follows, with reference to FIG. 5A: A client 502 sends a request 504 to an AS 501A, requesting "credentials" for a given server 503. This request is called an Authentication Service Request ("AS-REQ"). The AS 501A responds 504 with the requested credentials, encrypted in the client's key. The credentials consist of 1) a "ticket" for the server 503 and 2) a temporary encryption key (often called a "session key"). This response is called an Authentication Service Reply ("AS-REP").

The client 502 transmits the ticket (which contains the client's identity and a copy of the session key, all encrypted in a private server key) to the server 503. This transmission is designated in FIG. 5A by the communication arrow 505. This transmission is called the Authentication Protocol Request ("AP-REQ"). The session key (now shared by the client 502 and server 503) is used by the server 503 to authenticate the client 502, by decrypting the client's identity, and may optionally be used to authenticate the server 503. If the client 502 requests authentication of the server 503, thereby providing two-way authentication, the client 502 can encrypt a time stamp using the session key and transmit it to the server 503 along with the ticket. Only the server 503 will be able to decrypt the time stamp, because only the server 503 could decrypt the ticket to obtain the session key. The server 503 can then return the time stamp portion to the client 502, encrypted in the session key, thereby authenticating itself to the client 502. The server reply to the client is called the Authentication Protocol Reply ("AP-REP").

The session key may be used to encrypt further communication between the two parties or to exchange a separate subsession key to be used to encrypt further communication. A subsession key can be any key for use in encrypting and decrypting communications between two or more computers. It is an encryption and/or decryption key that is used subsequently to a first encryption and/or decryption key. Note that while standard Kerberos permits a key to be switched for a separate sub-session key, Kerberos on its own does not support the switch from one encryption algorithm to another. Instead, negotiating a change of encryption algorithms can be provided by the various embodiments of the invention described herein.

Remaining with FIG. 5A, Kerberos implementation consists of one or more authentication servers 501A running on physically secure hosts 501. The authentication servers 501A maintain a database of principals (i.e., clients 502 and servers 503) and their secret keys. Code libraries provide encryption and implement the Kerberos protocol. In order to add authentication to its transactions, a typical network application adds one or two calls to the Kerberos library, which results in the transmission of the necessary messages to achieve authentication. The Kerberos protocol consists of several sub-protocols (or exchanges). There are two methods by which a client 502 can ask a Kerberos server 501 for credentials. In the first approach, the client 502 sends a plaintext request for a ticket for the desired server 503 to the AS 501A. The reply is sent encrypted in the client's secret key. Usually this request is for a ticket-granting ticket (TGT) which can later be used with the ticket-granting server (TGS) 501B, which may also be a part of the KDC 501. In the second method, performed after the client 502 has obtained a TGT, the client 502 sends a request to the TGS 501B. The client sends the TGT to the TGS 501B in the same manner as if it were contacting any other application server which requires Kerberos credentials. The reply is encrypted in the session key from the TGT. Once obtained, credentials may be used to verify the identity of the principals in a transaction, to ensure the integrity of messages exchanged between them, or to preserve privacy of the messages. The application is free to choose whatever protection may be necessary.

To verify the identities of the principals in a transaction, the client 502 transmits the ticket to the server 503. Since the ticket is sent "in the clear" (parts of it may be encrypted, but this encryption doesn't thwart replay) and might be intercepted and reused by an attacker, additional information is sent to prove that the message was originated by the client 502 to whom the ticket was issued. This information (called the authenticator) is encrypted in the session key, and includes a timestamp, as mentioned above. The timestamp proves that the message was recently generated and is not a replay. Encrypting the authenticator in the session key proves that it was generated by a party possessing the session key. Since no one except the client 502 and the server 503 know the session key (it is never sent over the network in the clear) this guarantees the identity of the client 502.

The integrity of the messages exchanged between principals can also be guaranteed using the session key (passed in the ticket and contained in the credentials). This approach provides detection of both replay attacks and message modification attacks. It is accomplished by generating and transmitting a collision-proof checksum of the client's message, keyed with the session key. Privacy and integrity of the messages exchanged between principals can be secured by encrypting the data to be passed using the session key passed in the ticket, and contained in the credentials.

The authentication exchanges mentioned above are usually in the context of read-only access to the Kerberos database. Sometimes, however, the entries in the database must be modified, such as when adding new principals or changing a principal's key. This is done using a protocol between a client and yet another Kerberos server, the Kerberos Administration Server (KADM) (not shown). The administration protocol is not described in this document. There is also a protocol for maintaining multiple copies of the Kerberos database, but this can be considered an implementation detail and may vary to support different database technologies.

Authentication protocols can be used for any authentication. It is easy to imagine a computer user on a client computer authenticating him or herself to a server computer. A more subtle scenario is depicted in FIG. 5B, namely that of one or more applications 507A running on a client computer 502 engaging an authentication protocol 508A to access desired data on a server computer 503. For example, information for a database may be distributed across several computers. A database query initiated by an application 507A on a client computer 502 may require an authentication protocol 508A, 508B to access to the various machines such as server 503. In this situation, the database application, e.g., SQL SERVER or any other database application, would make a function call for the retrieval of the desired information. This function call would be made a particular Application Program Interface (API). An API is a language and message format used by an application program to communicate with the operating system or some other control program such as a database management system (DBMS) or communications protocol. APIs are implemented by writing function calls in an application, which provide the linkage to an indicated subroutine for execution.

Figure 6:
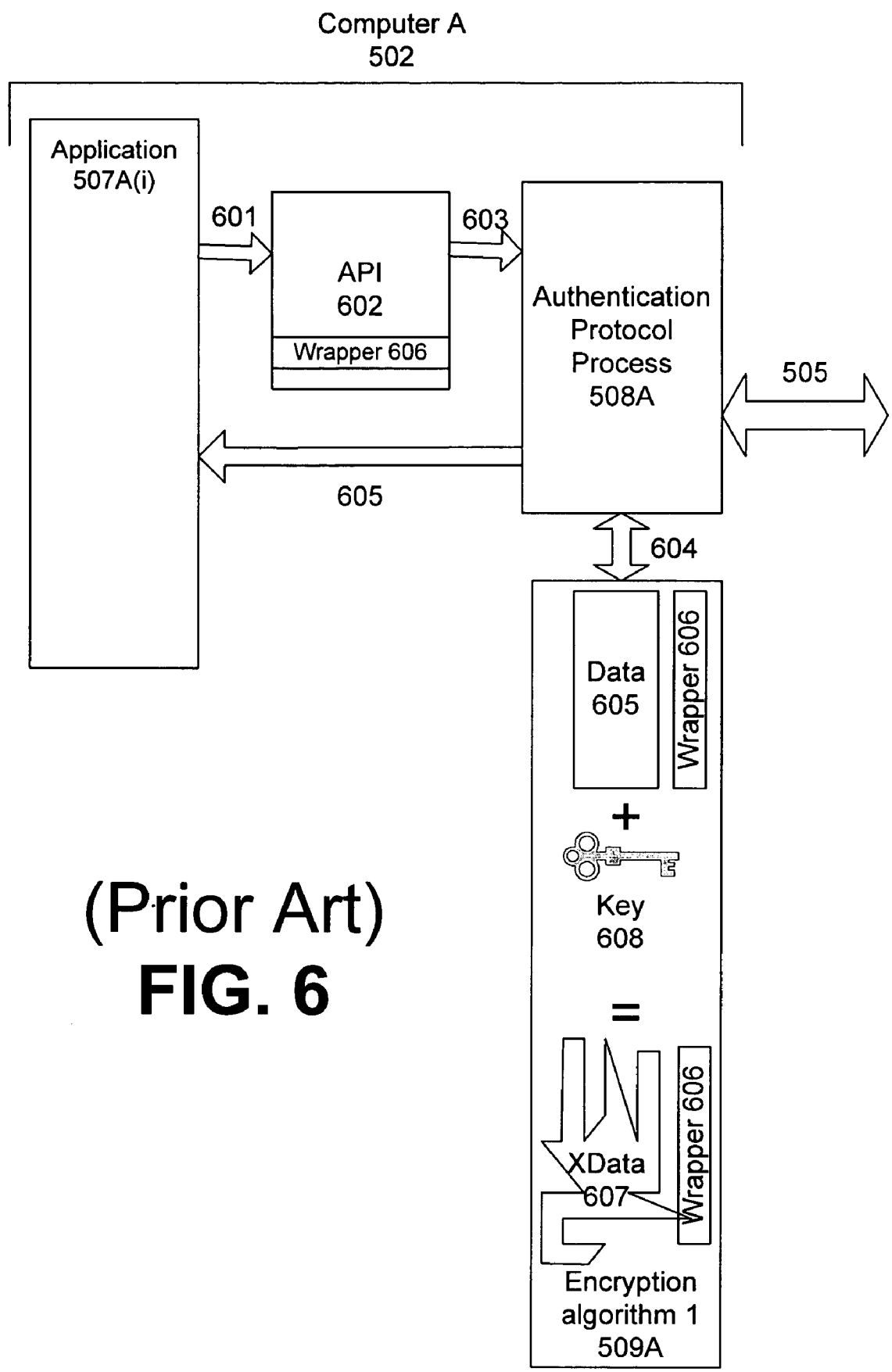
FIG. 6 is a more detailed view of the client computer in FIG. 5B, illustrating the process of engaging an encryption-based authentication protocol on behalf of an application that makes a function call requiring secure access to a server computer.

The scenario in which an application makes a function call to an API that triggers an authentication protocol is illustrated in FIG. 6. FIG. 6 is a detailed view of Computer A 502 from FIG. 5. As illustrated in FIG. 6, an Application 507A(i) makes a request for some processing or some data using a function call 601 to an API 602. It will be appreciated that any application and any API are candidates for use with the present invention. Some APIs, however, are particularly appropriate for use in conjunction with the present invention because they provide ready mechanisms to engage an authentication protocol process 508A as part of executing the function call 601 made by the Application 507A(i). One such API is the Generic Security Services Application Programming Interface ("GSSAPI"). While other APIs are available and could be used or modified to be used with the invention, GSSAPI is a preferred API for use with the invention because an implementation of the popular Kerberos protocol supports GSSAPI and also because GSSAPI provides readily available checksums for the negotiation of an encryption algorithm as taught by this invention.

The GSSAPI is a generic API for doing client-server authentication. The original motivation for GSSAPI was because many security systems have their own API, and the effort involved with adding different security systems to applications was difficult with the variance between security APIs. With a common API, application vendors can write to the generic API and the function calls in the resulting application can work with any number of security systems. A GSSAPI implementation is included in most Kerberos 5 distributions.

Returning to FIG. 6, the function call 601 to the API 602 will typically result in the generation of a data package containing data specific to the request, and as well as a wrapper 606 containing associated useful information. The subroutines called by the function call 601 to the API will also include initiation of an authentication protocol process 508A which will be used as described above to authenticate the client computer 502 prior to accessing the information or services originally requested by the application 507A(i). The authentication protocol process 508A, if an encryption-based process, will encrypt any data 605 to be used in the authentication process using a selected encryption algorithm, here generically referred to as encryption algorithm 1 509A, and an encryption key 608. It may or may not also encrypt the wrapper 606. As shown in FIG. 6, the result of the encryption process is encrypted authentication data ("XData" 607) and a wrapper 606 that may or may not also be encrypted, both of which may then be delivered 505 to the server computer as a subsequent part of the authentication protocol process 508A. Note that typically the entire authentication protocol process 508A, including the associated encryption, takes place "under the covers," in that the application 507A(i) need not be involved, or informed, of the procedures. From the view of the application 507A(i) a function call 601 was made, and it is simply waiting for the desired response 605. For purposes of this aspect of the invention, however, note that the application 507A(i) need not take such a passive role in determining the details of the authentication process.

Figure 7:
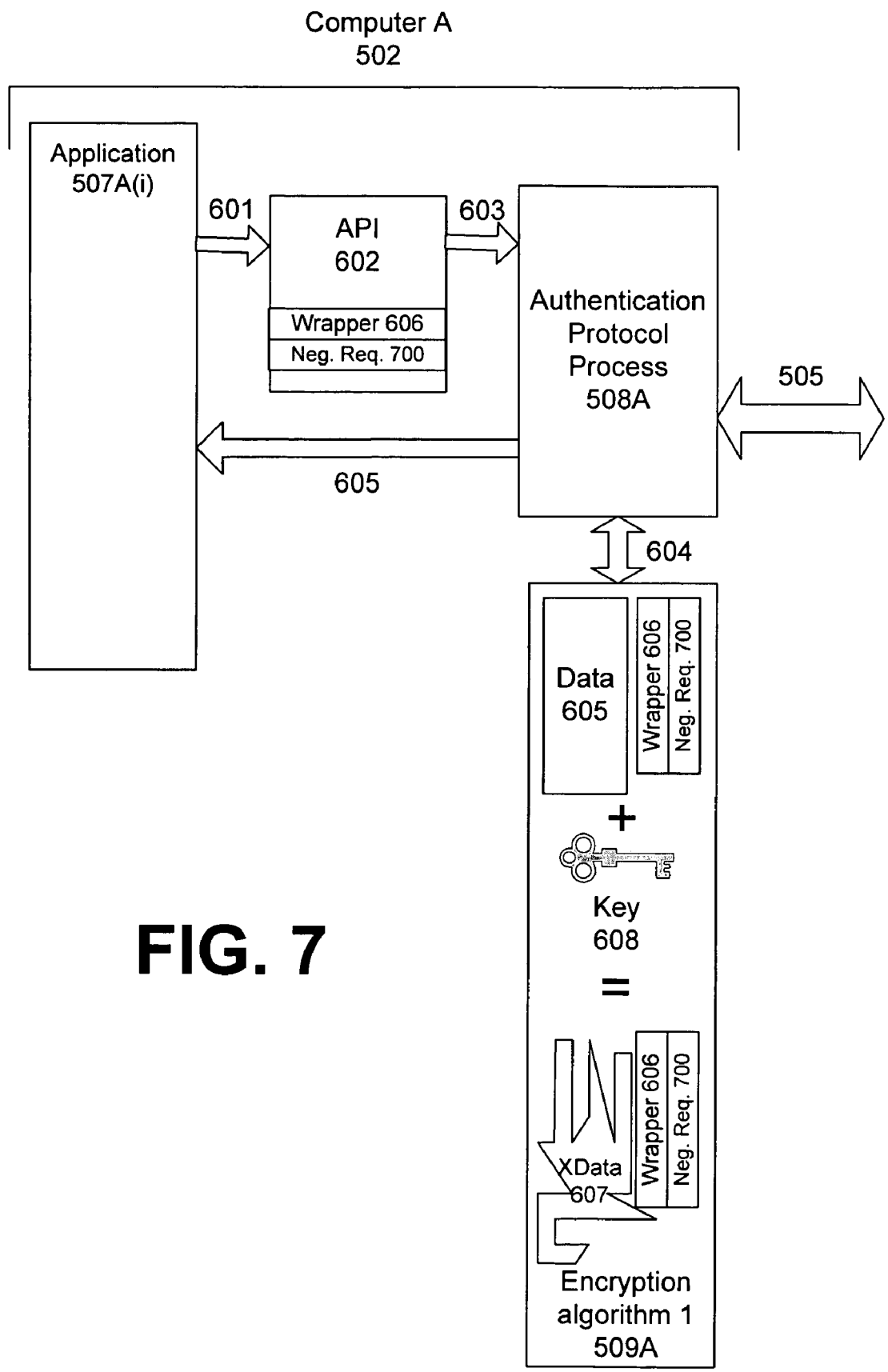
FIG. 7 demonstrates the inclusion of an encryption algorithm negotiation request with a communication to a server computer.

FIG. 7 contains many of the same elements of FIG. 6, but also illustrates a Negotiation Request 700 included with the wrapper 606 generated by the subroutines called by the API 602. As discussed above, the negotiation request 700 could take any form. In a preferred embodiment, it is a context negotiation flag in the checksum in the AP-REQ authenticator of GSSAPI Kerberos. Such a preferred embodiment allows negotiation of a new encryption algorithm without contacting the KDC 501 (see FIG. 5A) in the Kerberos protocol, and could be similarly useful in the context of other authentication protocols. However, the negotiation request 700 could also be accomplished in other ways, as will be appreciated. As shown in FIG. 7, the Negotiation Request 700 accompanies the wrapper 606 through the authentication protocol process, and is ultimately sent 505 along with any other authentication data 605 to the server computer (503 from FIG. 5B).

Figure 8:
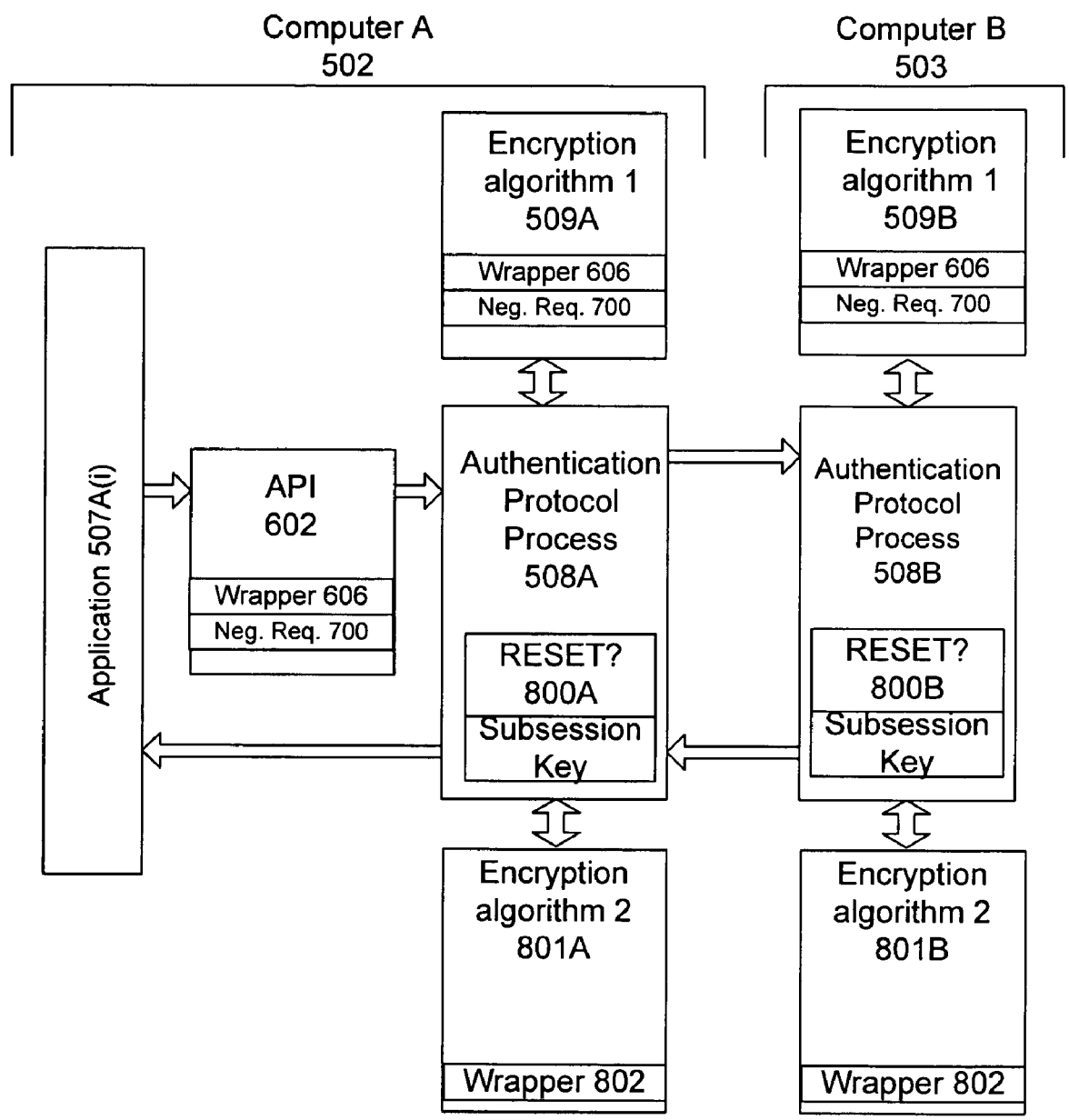
FIG. 8 is broader view of a system engaging in encryption algorithm negotiation in accordance with embodiments of the invention. A negotiation request is sent to a server computer, and a subsession key is sent back to the client computer in response.

FIG. 8 provides a broad view of various embodiments of the encryption algorithm negotiation process contemplated by the present invention. Again a client computer (Computer A 502) and a server computer (Computer B 503) are illustrated. FIG. 8 shows that the client computer 502 supports multiple encryption algorithms, here generically named encryption algorithm 1 509A and encryption algorithm 2 801A. Additional encryption algorithms may also be supported, and the invention is not limited to a selection between two encryption algorithms. Rather, the client computer 502 can use the present invention to select from any supported encryption algorithms. If the client computer 502 determines to request a new encryption algorithm, e.g., encryption algorithm 2 801A, then when Application 507A(i) makes a function call, the subroutines called by the API 602 are instructed to include a Negotiation Request 700 with the wrapper 606. The authentication protocol process may then encrypt the authentication data and/or the wrapper 606 and the negotiation request 700 using the first encryption algorithm, encryption algorithm 1 509A. After encryption, the authentication protocol process 508A running on the client computer 502 delivers any authentication data along with the negotiation request 700 to the server computer 503.

Remaining with FIG. 8, the server computer 503 engages its own authentication protocol process 508B to authenticate the client computer 502. If the server computer 503 supports the encryption algorithm indicated in the negotiation request 700, e.g., encryption algorithm 2 801B, then when the server computer 503 sees negotiation request 700 it can calculate a subsession key for use with the new encryption algorithm, and send it back to the client computer 502. Such recognition of an encryption algorithm negotiation is represented by the RESET? 800B function illustrated in FIG. 8, and detailed in FIG. 9A. The subsession key in the RESET? 880B box of FIG. 8 represents the calculation of a subsession key for use with the new encryption algorithm (encryption algorithm 2 801A) in the event that the client computer 503 indicated that it supported encryption algorithm 2 801A and the server computer 503 recognized the negotiation request 700 and also supports encryption algorithm 2 801A.

Figure 9A:
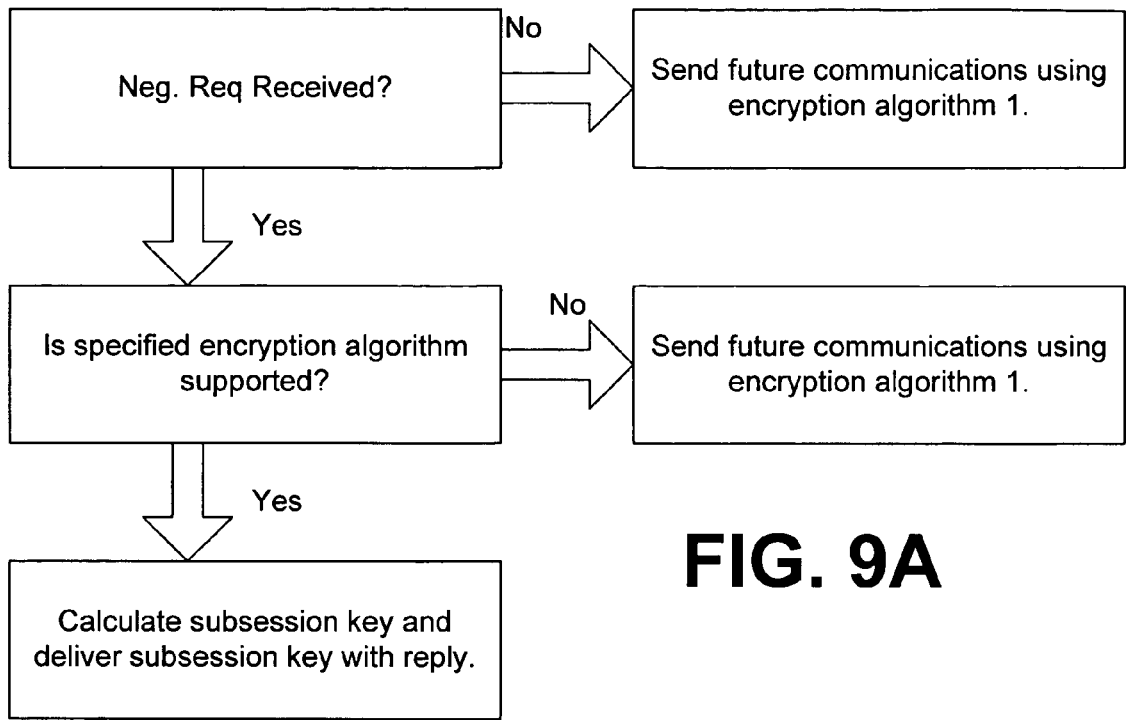
FIG. 9A is a flowchart demonstrating exemplary steps that may be engaged by a server computer after receiving a negotiation request. These steps are a more detailed view of the RESET? 800B function in FIG. 8.

Referring to FIG. 9A, the RESET? (800B from FIG. 8) function in the server computer (503 from FIG. 8) can be represented by a sequence of steps in a flow chart. First, the server computer can determine whether a negotiation request (700 from FIG. 8) was received. When the negotiation request comprises a checksum generated by GSSAPI subroutines, a server computer may completely ignore negotiation requests that it does not understand. Such a situation would lead to a determination that no negotiation request was received and therefore the server computer would remain with encryption algorithm 1 (509B from FIG. 8), the default encryption algorithm. If the negotiation request is understood, however, the server computer would presumably support the specified encryption algorithm, as determined by the next step illustrated in FIG. 9A.

If the new encryption algorithm is not supported, the server computer can send future communications as if no negotiation request was received. If, on the other hand, the specified new encryption algorithm is supported, the server computer can calculate a subsession key for use with the new encryption algorithm. The server computer may then send the subsession key to the client computer (502 from FIG. 8) with its reply. In Kerberos, for example a subsession key could be sent with the AP-REP. Various embodiments could encrypt the AP-REP containing the subsession key with the default encryption algorithm, encryption algorithm 1, because client computer should have an opportunity to decrypt the subsession key prior to switching encryption algorithms. Note, referring back to FIG. 8, that subroutines running on the server computer 503 may package authentication data with a wrapper 802 when sending a reply to the client computer 502. This wrapper may contain a negotiation acknowledgement, but that is not necessary in many embodiments of the invention and is therefore not depicted in FIG. 8. Instead, the client computer 502, as the computer that originally requested negotiation, can be configured to anticipate a subsession key for use with the new encryption algorithm. It will be acknowledged that while the preferred embodiment of the invention employs subsession key anticipation by the client computer 502, this is but one means of streamlining the recognition of a switch to a new algorithm and many other means are available for use with the invention.

Figure 9B:
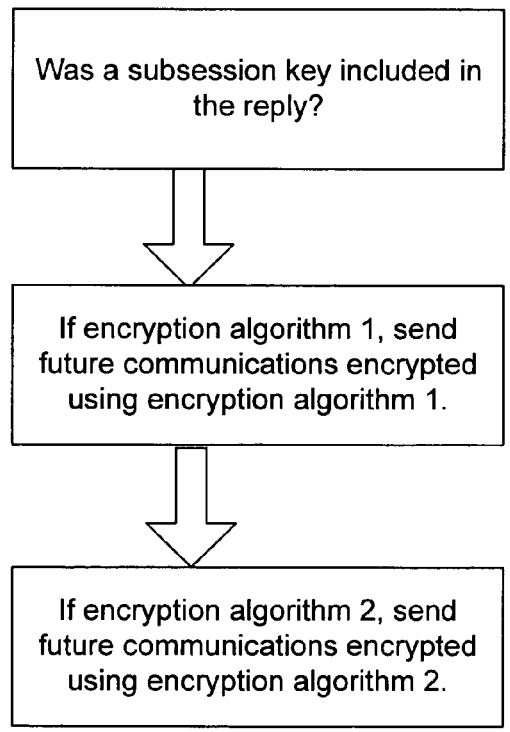
FIG. 9B is a flowchart demonstrating exemplary steps that may be engaged by a client computer after receiving a subsession key in response to sending a negotiation request. These steps are a more detailed view of the RESET? 800A function in FIG. 8.

Assuming, for the purpose of this description and with reference to FIG. 8, that the server computer 503 supports encryption mechanism 2 801B (the new encryption mechanism), then the final step of the negotiation is for the client computer 502 to also switch to encryption mechanism 2 801A. This process is represented by the RESET? 800A process of FIG. 8, and exemplary steps for carrying out the process are illustrated in FIG. 9B. Referring to FIG. 9B, the steps undertaken by the client computer (502 from FIG. 8) can be represented by a flowchart. First, the client computer can determine whether a subsession key is included in the reply from the server computer (503 from FIG. 8). If a subsession key for use with the new encryption algorithm was not included with the reply, then the client computer knows that the server computer either did not recognize or did not support the new encryption algorithm, e.g., encryption algorithm 2 (801A from FIG. 8), specified in the negotiation request (700 from FIG. 8). Therefore, the client computer can remain with encryption algorithm 1 (509A from FIG. 8) for the purpose of subsequent communications with that particular server computer.

If the reply includes a subsession key for use with the new encryption algorithm, encryption algorithm 2 (801A from FIG. 8), then the client computer can switch to encryption algorithm 2 (801A from FIG. 8) for purposes of future communications with the server computer. Note that this scenario, i.e., the determination by the client computer of the appropriate encryption algorithm based on whether a subsession key was sent by the server computer does not present the only way for such a determination to be made. The determination could also be made by other means, for example a negotiation acknowledgement checksum or an independent acknowledgement. Due to the convenience of deducing the appropriate algorithm using the technique described, however, determination based on the presence of an appropriate subsession key is considered a preferred embodiment.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A method employed on a server computer for switching from a first encryption algorithm to a second encryption algorithm, comprising:

receiving an encryption algorithm negotiation request from a client computer, wherein the encryption algorithm negotiation request specifies an encryption algorithm for subsequent communications between the client computer and the server computer;

sending a subsession key to the client computer, wherein the subsession key may be used by the client computer to switch from an established first encryption to a second encryption algorithm for use in conjunction with the selected encryption algorithm to encrypt future communications to the server computer; and determining the encryption algorithm for future communications between the first computer and the second computer by deriving an encryption algorithm from a key sent with said encryption algorithm negotiation request.

2. A method according to claim 1, wherein the receiving and sending are performed as part of an additional authentication protocol.

3. A method according to claim 2, wherein the authentication protocol is a Generic Security Services Application Programming Interface ("GSSAPI") implementation of a Kerberos authentication protocol.

4. A method according to claim 3, wherein the encryption algorithm negotiation request is a context negotiation flag in a checksum that is received by the server computer with an Authentication Protocol Request ("AP-REQ").

5. A method according to claim 4, wherein the AP-REQ is encrypted using one of the Ron's Code 4 ("RC4") encryption algorithm, the Data Encryption Standard ("DES") encryption algorithm, and the Triple Data Encryption Standard ("3DES") encryption algorithm.

6. A method according to claim 5, wherein the encryption algorithm negotiation request specifies the Advanced Encryption Standard ("AES") encryption algorithm for subsequent communications between the client computer and the server computer.

7. A computer readable storage medium containing instructions for a process of negotiating an encryption algorithm between two or more computers, said process comprising:

sending an encryption algorithm negotiation request to a server computer indicating that a client computer in current communication with the server supports a specified encryption algorithm;

anticipating a subsession key from the server computer for use with the specified encryption algorithm; and switching to the specified encryption algorithm if the subsession key for use with the specified encryption algorithm is delivered, wherein the specified encryption algorithm is derived from a key sent with said encryption algorithm negotiation request.

8. The computer readable storage medium of claim 7, wherein the process further comprises authenticating the server computer.

9. The computer readable storage medium of claim 8, wherein an authentication protocol is a Generic Security Services Application Programming Interface ("GSSAPI") implementation of a Kerberos authentication protocol.

10. The computer readable storage medium of claim 9, wherein the encryption algorithm negotiation request is a context negotiation flag in a checksum that is received by the server computer with an Authentication Protocol Request ("AP-REQ").

11. The computer readable storage medium of claim 10, wherein the AP-REQ is encrypted using one of the Ron's Code 4 ("RC4") encryption algorithm, the Data Encryption Standard ("DES") encryption algorithm, and the Triple Data Encryption Standard ("3DES") encryption algorithm.

12. The computer readable storage medium of claim 11, wherein the encryption algorithm negotiation request specifies the Advanced Encryption Standard ("AES") encryption algorithm for subsequent communications between the client computer and the server computer.

13. A method for automatically renegotiating an encryption algorithm when a first computer requests access to a second computer, comprising:
   receiving at the first computer a function call made by an application to an Application Programming Interface ("API");
   initiating in the first computer an authentication protocol process to authenticate the first computer to the second computer; and
   including an automatic negotiation request for an encryption algorithm with an authentication protocol process communication from the first computer to the second computer, wherein the negotiation request specifies that the first computer supports one or more encryption algorithms, wherein the negotiation request is a key, and wherein a supported encryption algorithm may be derived from the key.

14. The method of claim 13, further comprising anticipating a subsession key from the second computer for use with one or more of said one or more encryption algorithms.

15. The method of claim 14, further comprising switching by the first computer to one of said one or more encryption algorithms upon receiving said subsession key, wherein switching by the first computer is for the purpose of subsequent communications with the second computer.

16. The method of claim 14, wherein the authentication protocol process to authenticate the first computer to the second computer is a Kerberos authentication protocol process.

17. The method of claim 14, wherein the negotiation request specifies that the first computer supports the AES encryption algorithm.

18. The method of claim 14, wherein the negotiation request is in the form of a context negotiation flag in a checksum generated by a function call to the General Security Services Application Programming Interface ("GSSAPI").

19. A means embodied in a computer readable storage medium for negotiating an encryption algorithm between two or more computers involved in an authentication protocol, comprising:
   means for reading a negotiation request from a first computer, wherein said negotiation request is a negotiation request subsequent to transmission of a subsession key by the first computer and specifies one or more encryption algorithms supported by the first computer, and wherein the negotiation request is included with an authentication protocol communication from the first computer; and
   means for switching to one or more of said one or more encryption algorithms for the purpose of subsequent communications with said first computer, wherein each of said one or more encryption algorithms is derived from a respective key sent with said negotiation request.

20. A means embodied in a computer readable storage medium for negotiating an encryption algorithm according to claim 19, further comprising means for calculating and delivering a subsession key to the first computer for use with said one or more encryption algorithms.

21. A means embodied in a computer readable storage medium for negotiating an encryption algorithm according to claim 20, wherein the negotiation request specifies the Advanced Encryption Standard ("AES") encryption algorithm for subsequent communications between the client computer and the server computer.

22. A means embodied in a computer readable storage medium for negotiating an encryption algorithm according to claim 19, wherein the authentication protocol is a Generic Security Services Application Programming Interface ("GSSAPI") implementation of a Kerberos authentication protocol.

23. A means embodied in a computer readable storage medium for negotiating an encryption algorithm according to claim 22, wherein the encryption algorithm negotiation request is a context negotiation flag in a checksum that is received by the server computer with an Authentication Protocol Request ("AP-REQ").

* * * * *